United States Patent
Seidl

(10) Patent No.: US 8,800,428 B2
(45) Date of Patent: Aug. 12, 2014

(54) AXIAL DISPLACEMENT DEVICE FOR A VEHICLE TRANSMISSION

(71) Applicant: Knorr-Bremse Systeme fuer Nutzfahrzeuge GmbH, Munich (DE)

(72) Inventor: Tomas Seidl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/708,482

(22) Filed: Dec. 7, 2012

(65) Prior Publication Data

US 2013/0092021 A1  Apr. 18, 2013

Related U.S. Application Data

(63) Continuation of application No. PCT/EP2011/058857, filed on May 30, 2011.

(30) Foreign Application Priority Data

Jun. 9, 2010 (DE) .......................... 10 2010 023 144

(51) Int. Cl.
    *F16H 63/02* (2006.01)
(52) U.S. Cl.
    USPC .......................................... 92/161; 92/165 R
(58) Field of Classification Search
    USPC .............. 91/399, 401; 92/108, 113, 145, 161, 92/165 R
    See application file for complete search history.

(56) References Cited

U.S. PATENT DOCUMENTS

| 8,065,930 B2 * | 11/2011 | Sowul et al. ............... 74/473.11 |
| 2009/0241714 A1 | 10/2009 | Sowul et al. |

FOREIGN PATENT DOCUMENTS

| DE | 32 14 776 A1 | 10/1983 |
| DE | 10 2004 053 205 A1 | 6/2005 |
| DE | 10 2008 000 072 A1 | 7/2009 |
| DE | 10 2009 014 502 A1 | 10/2009 |
| DE | 10 2008 040 206 A1 | 1/2010 |
| DE | 102008040206 A1 * | 1/2010 |
| EP | 1548333 A1 * | 6/2005 |
| EP | 1 548 333 B1 | 9/2006 |
| JP | 61-154302 U | 9/1986 |
| JP | 3-39654 U | 4/1991 |

OTHER PUBLICATIONS

International Search Report dated Sep. 23, 2011 including English-language translation (Six (6) pages).
German Office Action dated Jan. 20, 2011 including English-language translation (Ten (10) pages).
International Preliminary Report on Patentability (PCT/IB/338 & PCT/IB/373), including Written Opinion (PCT/ISA/237) dated Dec. 20, 2012 (seven (7) pages).

* cited by examiner

*Primary Examiner* — Thomas E Lazo
(74) *Attorney, Agent, or Firm* — Crowell & Moring LLP

(57) ABSTRACT

A device for axially displacing a shaft in a vehicle transmission is provided, in particular a vehicle transmission of a commercial vehicle. In the device, forces are exerted on the shaft of the vehicle transmission in an axial direction via a fork. The device includes a piston, which is movable in the axial direction, in a piston housing. The piston is mounted on an inner guide, wherein an end of the inner guide projects out of the piston housing on one side and, there, is connected to an fixed with respect to a housing of the vehicle transmission.

6 Claims, 3 Drawing Sheets

10

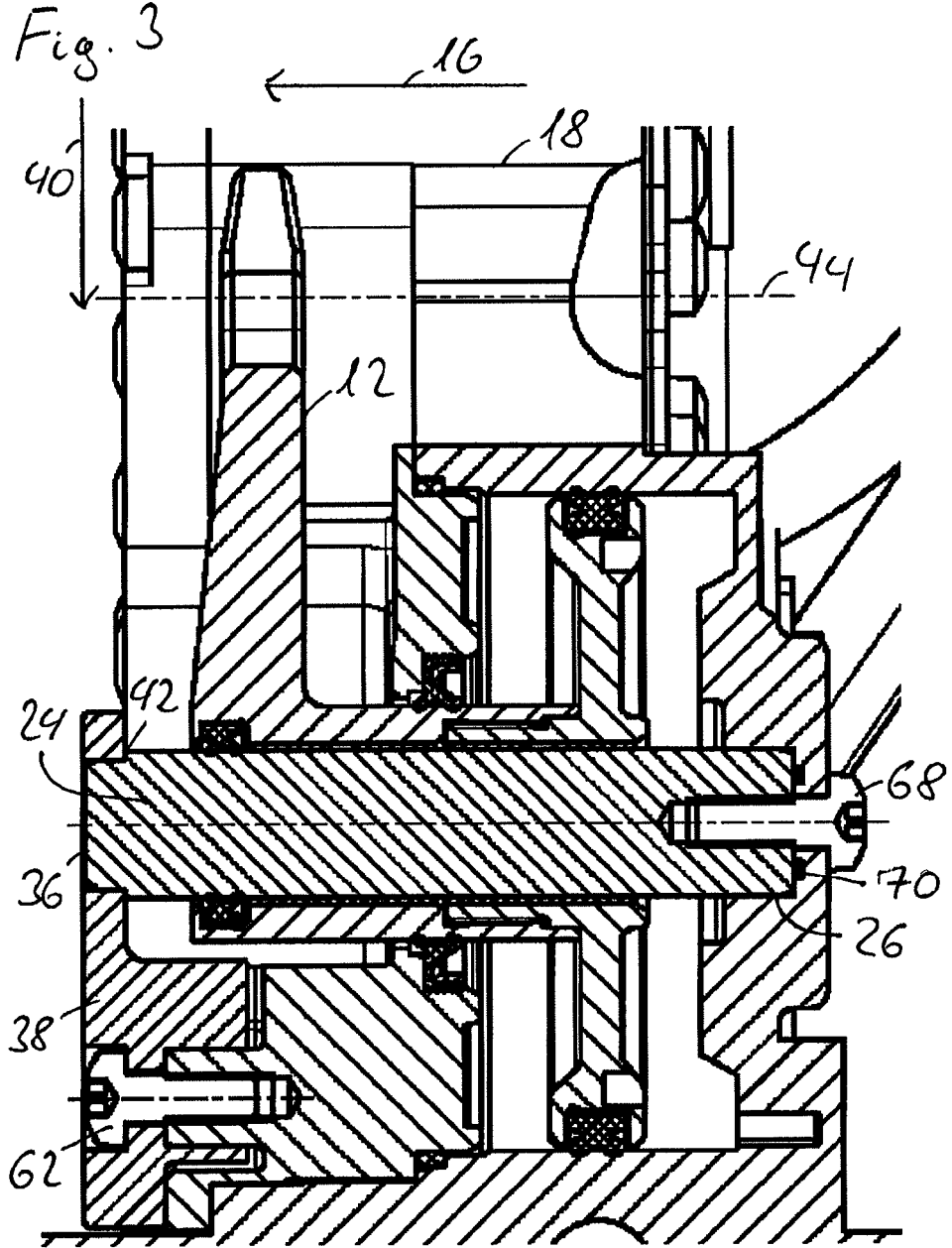

AXIAL DISPLACEMENT DEVICE FOR A VEHICLE TRANSMISSION

CROSS-REFERENCE TO RELATED APPLICATIONS

This application is a continuation of PCT International Application No. PCT/EP2011/058857, filed May 3, 2011, which claims priority under 35 U.S.C. §119 from German Patent Application No. DE 10 2010 023 144.4, filed Jun. 9, 2010, the entire disclosures of which are herein expressly incorporated by reference.

BACKGROUND AND SUMMARY OF THE INVENTION

The invention relates to a device for axially displacing a shaft in a vehicle transmission, in particular a vehicle transmission of a commercial vehicle.

The present disclosure concerns a device for generating a force parallel to a shaft arranged inside a transmission, and transmitting the generated force to the shaft. The shaft can, for example, be a synchronizer shaft which can be arranged in a vehicle transmission and must be displaced parallel to its axis on operation of the transmission. Because of the necessary bearing and lubrication of the synchronizer shaft and the restricted installation space, a direct connection of the synchronizer shaft to a piston displacing the shaft in the axial direction is not possible since then the necessary piston stroke could not be achieved.

The present invention is based on the object of providing a device which can generate the forces necessary for operation of the transmission on the shaft in the axial direction without direct connection to the shaft.

This and other objects are achieved in accordance with the invention by providing a device for axially displacing a shaft in a vehicle transmission, in particular a vehicle transmission of a commercial vehicle, in which forces are exerted on the shaft of the vehicle transmission in an axial direction via a fork. The device comprises a piston movable in the axial direction in a piston housing, wherein the piston is mounted on an inner guide and wherein an end of the inner guide protrudes from the piston housing on one side and is there connected to and fixed in relation to the housing of the vehicle transmission. Via the fork, the piston can be connected with the shaft in a simple manner, wherein using this construction an arbitrary piston stroke can be achieved because of the axial offset between the shaft and the piston. In order to absorb the transverse forces, which are transmitted via the fork because of the axial offset, perpendicular to the axial direction on the piston, the inner guide is provided, which on one side can protrude beyond the piston housing and there be connected with the transmission housing in order to divert the transverse forces.

Here it can be provided that the piston divides a pressure chamber provided in the interior of the piston housing into a first region and a second region. This allows a pressure-induced shift of the piston in the positive and negative axial direction, wherein both a positive and a negative force can be exerted on the shaft in the axial direction by the two separated regions.

It can furthermore be provided that on the inner guide a groove ring is provided to seal the pressure chamber. This allows separation of any abrasion occurring due to the piston movement from the interior of the transmission.

It can also be provided that a further end of the inner guide protrudes beyond the piston housing on a further side of the piston housing and that a support is provided which receives the further end and fixes this in relation to the housing of the vehicle transmission. By means of this support the flexion of the inner guide under transverse load is reduced, whereby a simpler fixing of the inner guide is possible on the opposite side. This leads to a reduction in component cost.

It can furthermore be provided that the support has a bearing play in a radial direction.

In particular it can be provided that the inner guide has a step against the support. In this way axial forces acting on the inner guide can be diverted to the housing of the transmission.

It can also be provided that the inner guide is designed as a central guide. In this way forces acting on the contact points between the piston and piston housing can be evenly distributed.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a third embodiment of an axial displacement device.

DETAILED DESCRIPTION OF THE DRAWINGS

Figure 1:
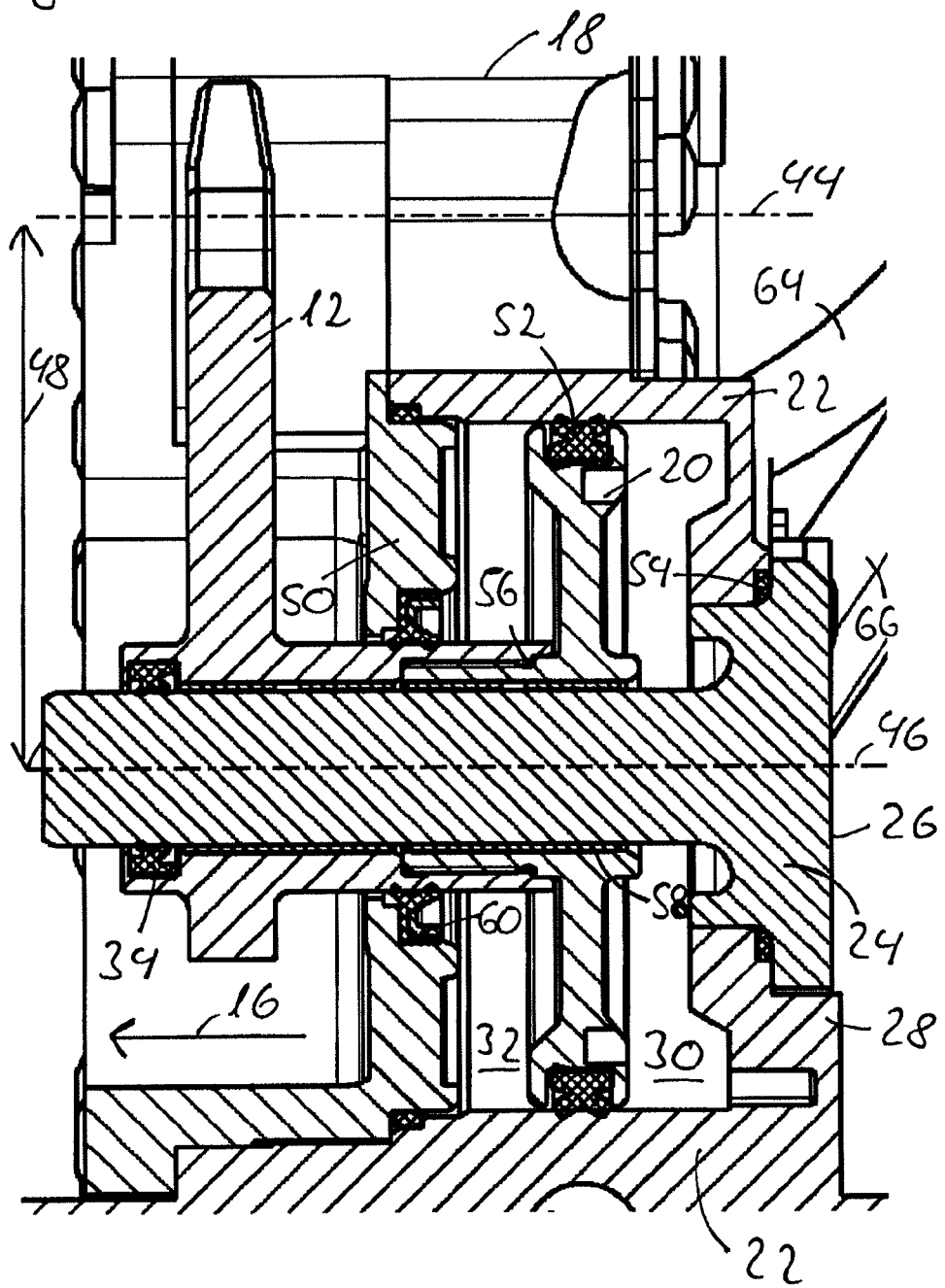
FIG. 1 shows a first embodiment of an axial displacement device.

In the drawings, the same reference numerals indicate the same or equivalent components.

FIG. 1 shows a first embodiment of an axial displacement device. The device 10 includes a piston 20 which is arranged displaceably in an axial direction 16 in the interior of the piston housing 22, which is closed by a cover 50. The piston 20 is arranged on an inner guide 24 which can for example be arranged centrally. The piston housing 22 can be designed for example as part of the housing 28 of the vehicle transmission. The piston 20, via a connection 56, can carry a fork 12 in the axial direction 16. The connection 56 between the piston 20 and the fork 12 can be a threaded connection with mounting secured by use of an adhesive, so that the piston 20 together with the fork 12 forms a stable and robust component. The piston 20 divides the pressure chamber provided in the interior of the piston housing 22 into a first region 30 and a second region 32, wherein a further groove ring 52 arranged on the piston 20 seals off the first region 30 from the second region 32.

The two regions 30, 32 of the pressure chamber can each be pressurized via a compressed air line 64 and a further compressed air line 66 in order, via an axial displacement of the piston 20, to generate a force on the fork 12 in the axial direction 16, by which force a shaft 18 can be displaced. The shaft 18 can be, for example, a synchronizer shaft of the vehicle transmission. The shaft 18 has a shaft axis 44 which has an axial offset 48 in relation to a guide axis 46 of the inner guide 24. Because of the axial offset 48, transverse forces occur on transmission of the force in the axial direction 16 to the shaft 18 via the fork 12. These transverse forces are absorbed by the inner guide 24 and diverted via a housing 28 of the transmission. For this purpose, an end 26 of the inner guide 24 protrudes beyond the piston housing 22, wherein the end 26 of the inner guide 24 is fixedly connected with a housing 28 of the vehicle transmission. Between the inner guide 24 and the housing 28 is provided an O-ring 54 in order to seal off the pressure chamber in the interior of the piston housing 22 from the outside.

A groove ring 34 and a seal 60 are furthermore provided to seal the pressure chamber in the piston housing 22 from the environment. The piston 20 and the fork 12, which are coupled together via the connection 56, sit on two bearing bushes 58 on the inner guide 24 in order to allow the axial displaceability of the piston 20 and the fork 12. It is also contemplated that the inner guide 24 is arranged with an offset to the central guide axis 46, for example in order to shorten the fork 12.

The device 10 described can, for example, exert a force of up to 3.2 kN on the shaft 18 in the axial direction 16 via the fork 12. The bearing and lubrication of the shaft 18 can be achieved in the normal manner due to the axial offset 48. For a predefined control pressure for the piston 20 of, for example, around 8.3±0.2 bar, to generate the force required of up to 3.2 kN, a piston diameter of around 81 mm is required, giving an axial offset 48 of at least 65 mm. The fork 12 can, for example, have a reinforcing rib, for example a stiffening rib, reducing the flexion of the fork 12 under load. Due to the axial offset 48, great transverse forces occur on the inner guide 24 so that the bearing bush 58 must also be designed to be correspondingly robust. The slide bushes can for example consist of steel while the running surfaces of the bushes can be a combination of Teflon and bronze, which can be pressed into the piston 20 and fork 12 and run on the hardened and polished surfaces of the slide bushes which, for example, can be arranged on the inner guide 24. The inner guide 24 can, for example, be produced in a forging process from a high-quality steel, for example CF45, and be pressed into the housing 28 made for example of aluminum, wherein additionally further fixing bolts can be provided as required, for example 4×M6 bolts. The seal between the housing 28 and the inner guide 24 is achieved by an O-ring 54, wherein additionally for example a sealing liquid, for example Loctite 510, can be provided as a seal. The piston 20 and the fork 12, like the inner guide 24, can for example be forged from a high-quality steel, for example CF45. The further groove ring 52 can be designed as a double-sided groove ring in order to seal the first region 30 and the second region 32 of the pressure chamber against each other. It is however also contemplated to provide two groove rings with unilateral seal in opposite directions. The seal 60 is designed as a press-in seal with a steel insert and is pressed into the cover 50 to guarantee the stable seal of the pressure chamber. This requires less installation space than a conventional groove ring which would require a support in a sealing groove on both sides, but this can however also be provided.

Figure 2:
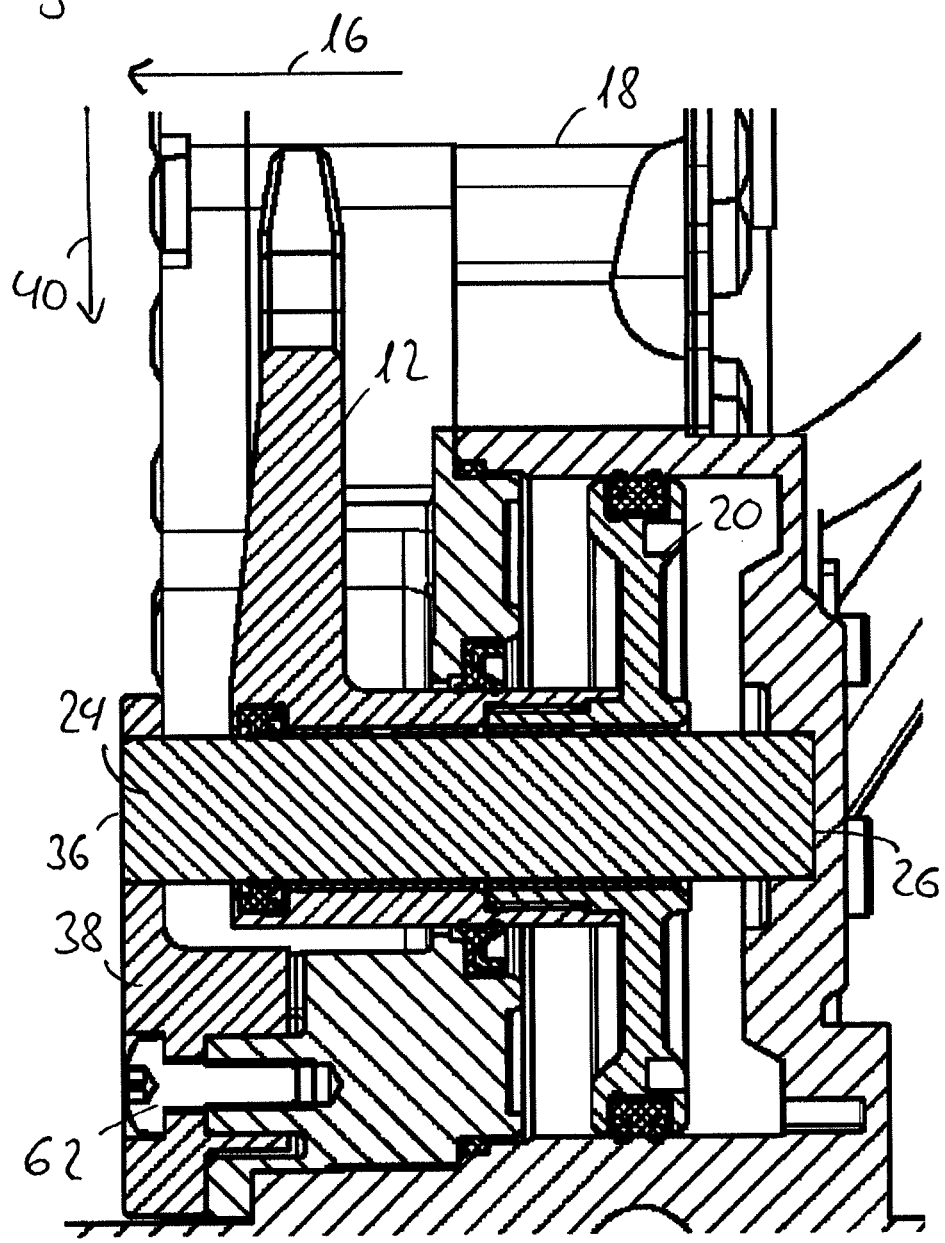
FIG. 2 shows a second embodiment of an axial displacement device.

FIG. 2 shows a further embodiment of an axial displacement device. The device 10 shown in FIG. 2 differs in particular by a support 38, which receives a further end 36 of the inner guide 24 opposite the end 26. The support 38 fixes the inner guide 24 against the housing 28 of the transmission in a radial direction 40 in relation to the cover 50. The support 38 is fixed via a fixing bolt 62 against displacement in the radial direction 40. The support 38 here absorbs in the radial direction 40 part of the transverse forces occurring on movement of the shaft 18 in the axial direction 16, so that the inner guide 24 has less flexion. In this way the possible stroke of the piston 20 is not restricted by flexion of the inner guide 24, so that in particular a restriction of the total movement stroke of the shaft 18 is avoided. The support 38 can for example be made of a high-quality steel. A slight bearing play can be provided in the radial direction 40. Furthermore by the support 38 at the further end 36 of the inner guide 24, a simpler fixing of the inner guide 24 against the housing 28 can be achieved at the opposite end 26 of the inner guide 24. For example the inner guide 24 can be produced as a rotating part and be fitted into the housing 28 with a press fit under a great temperature difference, thanks to the different temperature expansion coefficients of the different materials used.

FIG. 3 shows a third embodiment of an axial displacement device. In the device 10 shown in FIG. 3, the inner guide 24 is fixed in the axial direction 16 using a step 42 against the support 38. Furthermore a further fixing bolt 68 is provided on the opposite end 26 of the inner guide 24, which also absorbs a possible load in the axial direction 16. A further O-ring 70 is here provided as a seal between the inner guide 24 and the housing 28. The further fixing bolt 68 may be necessary for example if the press fit of the simplified fixing of the inner guide 24, as described in connection with FIG. 2, is not sufficient for the expected forces.

LIST OF REFERENCE NUMERALS

10 Device
12 Fork
16 Axial direction
18 Shaft
20 Piston
22 Piston housing
24 Inner guide
26 End
28 Housing
30 First region
32 Second region
34 Groove ring
36 Further end
38 Support
40 Radial direction
42 Step
44 Shaft axis
46 Guide axis
48 Axial offset
50 Cover
52 Further groove ring
54 O-ring
56 Connection
58 Bearing bush
60 Seal
62 Fixing bolt
64 Compressed air line
66 Further compressed air line
68 Further fixing bolt
70 Further O-ring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for axially displacing a shaft in a vehicle transmission, in which forces are exerted on the shaft of the vehicle transmission in an axial direction via a fork, the device comprising:
   a vehicle transmission housing;
   a piston housing;
   a piston movable in the axial direction in the piston housing;
   an inner guide on which the piston is mounted;

wherein an end of the inner guide protrudes from the piston housing on one side and is connected to and fixed on the one side in relation to the vehicle transmission housing;

wherein a further end of the inner guide protrudes beyond the piston housing on a further side of the piston housing, and a support configured to receive the further end and fix the further end in relation to the vehicle transmission housing; and wherein the inner guide has a step against the support.

2. The device according to claim 1, wherein the piston divides a pressure chamber provided in an interior of the piston housing into a first region and a second region.

3. The device according to claim 2, further comprising a groove ring provided on the inner guide in order to seal the pressure chamber.

4. The device according to claim 1, wherein the support has a bearing play in a radial direction.

5. The device according to claim 1, wherein the inner guide is formed as a central guide.

6. The device according to claim 1, wherein the vehicle transmission housing is a commercial vehicle transmission.

* * * * *